(12) United States Patent
Yun et al.

(10) Patent No.: US 8,705,814 B2
(45) Date of Patent: Apr. 22, 2014

(54) APPARATUS AND METHOD FOR DETECTING UPPER BODY

(75) Inventors: Woo Han Yun, Daejeon (KR); Do Hyung Kim, Daejeon (KR); Jae Yeon Lee, Daejeon (KR); Kyu Dae Ban, Gyeongsangbuk-do (KR); Dae Ha Lee, Daejeon (KR); Mun Sung Han, Daejeon (KR); Ho Sub Yoon, Daejeon (KR); Su Young Chi, Daejeon (KR); Yun Koo Chung, Daejeon (KR); Joo Chan Sohn, Daejeon (KR); Hye Jin Kim, Daejeon (KR); Young Woo Yoon, Daejeon (KR); Jae Hong Kim, Daejeon (KR); Jae Il Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 91 days.

(21) Appl. No.: 13/332,879

(22) Filed: Dec. 21, 2011

(65) Prior Publication Data

US 2012/0155719 A1    Jun. 21, 2012

(30) Foreign Application Priority Data

Dec. 21, 2010   (KR) .................. 10-2010-0131825

(51) Int. Cl.
*G06K 9/00* (2006.01)
(52) U.S. Cl.
USPC ............ 382/118; 382/103; 382/128; 382/165

(58) Field of Classification Search
USPC ................... 382/165, 128, 118, 103
See application file for complete search history.

(56) References Cited

U.S. PATENT DOCUMENTS

| | | | |
|---|---|---|---|
| 5,629,752 A * | 5/1997 | Kinjo .............................. | 355/35 |
| 5,751,831 A * | 5/1998 | Ono ............................... | 382/103 |
| 7,643,659 B2 * | 1/2010 | Cao et al. ....................... | 382/118 |
| 7,876,938 B2 * | 1/2011 | Huang et al. ................... | 382/128 |
| 7,881,494 B2 * | 2/2011 | Kitamura ........................ | 382/103 |
| 8,284,991 B2 * | 10/2012 | Tojo et al. ...................... | 382/103 |
| 2001/0019620 A1 * | 9/2001 | Nagai et al. .................... | 382/104 |
| 2003/0071908 A1 * | 4/2003 | Sannoh et al. ................. | 348/345 |
| 2003/0103647 A1 * | 6/2003 | Rui et al. ........................ | 382/103 |
| 2006/0126938 A1 * | 6/2006 | Lee et al. ....................... | 382/190 |
| 2007/0092134 A1 * | 4/2007 | Fukui et al. .................... | 382/160 |
| 2009/0059029 A1 * | 3/2009 | Hoshii ........................ | 348/222.1 |
| 2009/0060294 A1 * | 3/2009 | Matsubara et al. ............ | 382/118 |
| 2009/0150511 A1 | 6/2009 | Gross et al. | |
| 2010/0220925 A1 * | 9/2010 | Ikeda et al. .................... | 382/165 |

\* cited by examiner

*Primary Examiner* — Vu Le
*Assistant Examiner* — Aklilu Woldemariam
(74) *Attorney, Agent, or Firm* — Nelson Mullins Riley & Scarborough LLP; Anthony A. Laurentano, Esq.; John S. Curran, Esq.

(57) ABSTRACT

Disclosed is a method of detecting an upper body. The method includes detecting an omega candidate area including a shape formed of a face and a shoulder line of a human from a target image, cutting the target image into the upper body candidate area including the omega candidate area, detecting a human face from the upper body candidate area, and judging whether the upper body of the human is included in the target image according to the result of detecting the human face.

9 Claims, 7 Drawing Sheets

APPARATUS AND METHOD FOR DETECTING UPPER BODY

CROSS-REFERENCE TO RELATED APPLICATIONS

This application claims priority to and the benefit of Korean Patent Application No. 10-2010-0131825 filed in the Korean Intellectual Property Office on Dec. 21, 2010, the entire contents of which are incorporated herein by reference.

TECHNICAL FIELD

The present invention relates to an apparatus and a method for detecting an upper body that is capable of detecting an upper body using an efficient method.

BACKGROUND ART

Since a technology that detects an upper body of a human can be applied to various fields such as security surveillance, an intelligent robot, and entertainment which utilizes face recognition, person tracking, and gesture recognition, aggressive research and studying is required.

Therefore, various methods regarding the upper body detecting technology have been studied, and are still being studied.

However, the conventional upper body detecting technologies have some problems such as a high misdetection rate and a low correct detecting rate. Further, it takes a long time to detect an upper body. Therefore, it is difficult to commercialize the conventional upper body detecting technology. Subsequently, the industries need to develop an upper body detecting technology which can be commercialized for the actual application.

SUMMARY OF THE INVENTION

The present invention has been made in an effort to provide an apparatus and a method for detecting an upper body that uses a mixed method of an omega shape detecting method, a face recognizing method, and a side/rear verification method in an image.

An exemplary embodiment of the present invention provides an apparatus for detecting an upper body, including: an omega field detecting unit configured to detect an omega field including a shape formed of a face and a shoulder line of a human from a target image; a face detecting unit configured to detect whether the human face is included in the omega field; and an upper body judging unit configured to judge whether the upper body of a human is included in the target image on the basis of the result of detecting the human face.

The omega field detecting unit may include a resizing unit configured to reduce a width or a length of the target image by a predetermined percentage; a first feature deducing unit configured to deduce a weight of coordinates of the reduced target image and deduce a first feature on the basis of the deduced weight; and an omega field judging unit configured to judge whether the omega field is included in the target image by comparing the first feature with a reference value.

The omega field detecting unit may further include a first memory configured to store a three-dimensional first lookup table that is trained based on the adaboost algorithm; and the first feature deducing unit deduces the first feature based on the first lookup table.

The first lookup table may be trained and deduced based on the adaboost algorithm using an omega shape example image as a positive set and the other images than the omega shape example image as a negative set.

The apparatus may further include, if the human face is not detected by the face detecting unit, a side/rear verifying unit configured to verify whether a side or a rear of a human exists in the omega field.

The side/rear verifying unit may include a second memory configured to store a three-dimensional second lookup table trained based on the adaboost algorithm; a second feature deducing unit configured to deduce a weight of coordinates of the omega field based on the second lookup table and deduce a second feature based on the deduced weight; and a side/rear judging unit configured to judge whether the side or the rear of a human is included in the omega field by comparing the second feature with a reference value.

The second lookup table may be trained and deduced based on the adaboost algorithm using a human side/rear example image as a positive set and the other images than the human side/rear example image as a negative set.

Another exemplary embodiment provides a method for detecting an upper body, including: detecting an omega candidate area including a shape formed of a face and a shoulder line of a human from a target image; cutting the target image into the upper body candidate area including the omega candidate area; detecting a human face from the upper body candidate area; and judging whether the upper body of the human is included in the target image according to the result of detecting the human face.

The judging may include, if the human face is detected in the detecting of the human face, judging that the human upper body is included in the target image.

The detecting may include determining whether a width or a length of the target image is larger than a predetermined threshold TH; reducing the size of the target image by a predetermined percentage if the width or the length of the target image is larger than the predetermined threshold; pre-processing the resized target image; deducing a first feature from the pre-processed target image; and judging if the omega candidate area is included in the target image based on the deduced first feature.

The judging may include, if the human face is not detected in the detecting of the human face, detecting a side or a rear of a human from the upper body candidate area.

The detecting of the side or the rear of a human may include pre-processing the upper body candidate area; deducing a second feature from the pre-processed upper body candidate area; and judging whether the side or the rear of a human exists in the upper body candidate area by comparing the second feature with a predetermined reference value, and the pre-processing includes any one of an edge detecting process and an MCT process.

According to exemplary embodiments of the present invention, it is possible to rapidly and precisely detect an upper body of a human by combining a face detecting method, an omega field method, and a side/rear verification method to detect the upper body.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
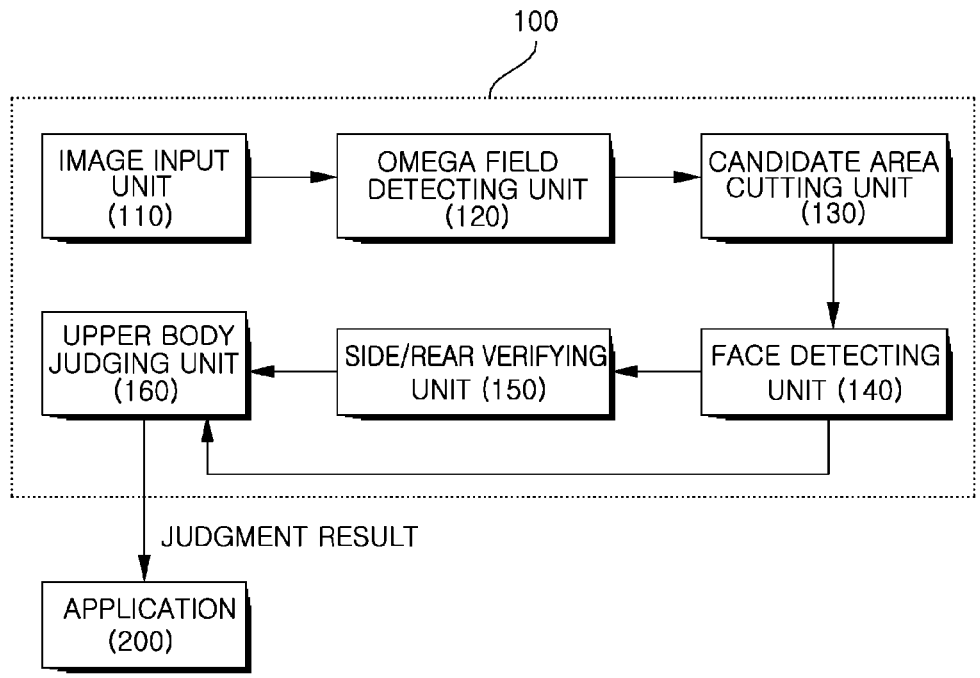
FIG. 1 is a block diagram illustrating an upper body detecting apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Exemplary embodiments of the present invention may be implemented by various means. For example, the exemplary embodiments of the present invention may be implemented firmware, software, or a combination thereof, or the like.

In the implementation by the hardware, a method according to exemplary embodiments of the present invention may be implemented by application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the implementation using the firmware or the software, a method according to exemplary embodiments of the present invention may be implemented by modules, procedures, functions, or the like, that perform functions or operations described above. Software codes are stored in a memory unit and may be driven by a processor. The memory unit is disposed in or out the processor and may transmit and receive data to and from the well-known various units.

Throughout the specification, when a predetermined portion is described to be "connected to" another portion, it includes a case where the predetermined portion is electrically connected to the other portion by disposing still another predetermined portion therebetween, as well as a case where the predetermined portion is directly connected to the other portion. Also, when the predetermined portion is described to include a predetermined constituent element, it indicates that unless otherwise defined, the predetermined portion may further include another constituent element, not precluding the other constituent element.

Also, the term module described in the present specification indicates a single unit to process a predetermined function or operation and may be configured by hardware or software, or a combination of hardware and software.

Specific terms are provided to help understandings of the present invention. The use of the specific terms may be changed into other forms without departing from the technical idea of the present invention.

Hereinafter, exemplary embodiments of the present invention will be described in detail with reference to the accompanying drawings.

FIG. 1 is a block diagram illustrating an upper body detecting apparatus according to an exemplary embodiment of the present invention.

According to the exemplary embodiment of the invention, an upper body detection result detected by an upper body detecting device 100 is provided to various applications 200 such as security surveillance, an intelligent robot, and entertainment to be utilized.

The upper body detecting device 100 according to the exemplary embodiment includes an image input unit 110, an omega field detecting unit 120, a candidate area cutting unit 130, a face detecting unit 140, a side/rear verifying unit 150, and an upper body judging unit 160.

The image input unit 110 according to the exemplary embodiment is configured to receive an image input through a camera (not shown).

The omega field detecting unit 120 according to the exemplary embodiment is configured to detect an omega field (Ω) from an image, which is input to the image input unit 110. Here, the omega field refers to an area including a shape formed of a face and a shoulder line of a human.

Specifically, the omega field detecting unit 120 performs omega detection for various sizes of input images and all positions of the images to detect an omega candidate area where there is a high possibility that an omega field may be included. If the omega candidate area does not exist, the omega field detecting unit 120 determines that an upper body is not included in the input image and completes the upper body detection.

If the omega candidate area exits, the omega field detecting unit 120 transmits information regarding the omega field to the candidate area cutting unit 130.

The candidate area cutting unit 130 according to the exemplary embodiment is configured to cut into an upper body candidate area including the omega candidate area detected by the omega field detecting unit 120. Here, the upper body candidate area is preferably an area cut so as to correspond to a rectangle with respect to a rectangle coordinate.

The face detecting unit 140 according to the exemplary embodiment is configured to detect a human face from the upper body candidate area cut by the candidate area cutting unit 130. If the human face is detected, there is a high possibility that the input image may include a human image including an upper body facing the front. Accordingly, the face detecting unit 140 transmits the detection result to the upper body judging unit 160.

However, if the human face is not detected from the upper body candidate area, the face detecting unit 140 transmits the upper body candidate area to the side/rear verifying unit 150. The face detecting method is preferably embodied based on an adaboost algorithm.

If the face detecting unit 140 fails to detect the human face from the upper body candidate area, the side/rear verifying unit 150 according to the exemplary embodiment receives the upper body candidate area and verifies whether there is a side or a rear of a human in the upper body candidate area.

If it is verified that there is the side or the rear of a human, the side/rear verifying unit 150 transmits the result to the upper body judging unit 160. If it is verified there is no side or rear of a human, the side/rear verifying unit 150 determines that the upper body is not included in the input image and completes the upper body detection.

The upper body judging unit 160 according to the exemplary embodiment receives the result transmitted from the face detecting unit 140 or the side/rear verifying unit 150 to finally determine whether the upper body is included in the corresponding image.

If a face is detected by the face detecting unit 140 or the side/rear verifying unit 150 verifies that a side or a rear of a human is present, the upper body judging unit 160 determines that the upper body of a human is included in the corresponding image.

Figure 2:
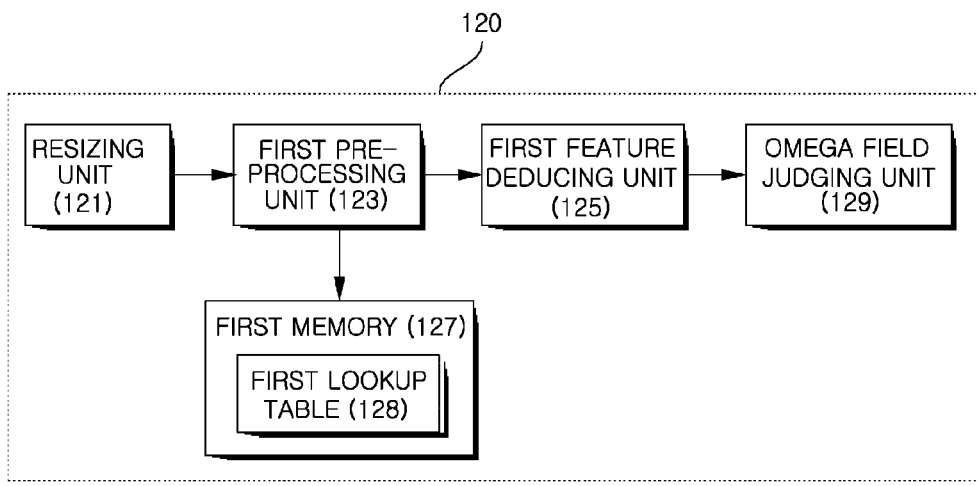
FIG. 2 is a block diagram illustrating an omega field detecting unit according to an exemplary embodiment of the present invention.
Figure 3:
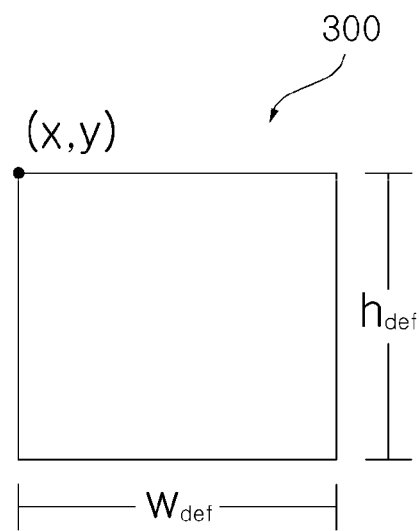
FIG. 3 is a diagram showing a window area according to an exemplary embodiment of the present invention.

FIG. 2 is a block diagram illustrating an omega field detecting unit according to an exemplary embodiment of the present invention. FIG. 3 is a diagram showing a window area according to an exemplary embodiment of the present invention.

The omega field detecting unit 120 according to the exemplary embodiment includes a resizing unit 121, a first pre-processing unit 123, a first feature deducing unit 125, a first memory 127, and an omega field judging unit 129.

In order to detect omega shapes having various sizes for an image transmitted from the image inputting unit 110, the resizing unit 121 according to the exemplary embodiment is configured to reduce the size of the image by a predetermined percentage until a width or a length of the image is below a predetermined threshold TH.

The first pre-processing unit 123 according to the exemplary embodiment performs a pre-processing process on an image reduced by the resizing unit 121. Here, the pre-processing process is preferably an MCT (Modified Census Transform) process, but is not limited thereto.

The first feature deducing unit 125 according to the exemplary embodiment is configured to deduce a feature for a window area (X, Y, Wdef, and Hdef) in the corresponding image as shown in FIG. 3 with reference to a first lookup table 128. The first feature deducing unit 125 according to the exemplary embodiment deduces a weight of the respective coordinates in the window through the first lookup table 128 and deduces the feature using the weight. More important the deduced feature is, the lower the deduced feature is.

The first memory 127 according to the exemplary embodiment is configured to store the first lookup table 128. The first memory 127 also includes various information and data in addition to the first lookup table 128.

The first lookup table 128 according to the exemplary embodiment is configured by a three-dimensional rectangular parallelepiped of f(x, y, z). Here, f(x, y, z) refers to the weight of the corresponding coordinate. An x value and a y value refer to a coordinate in the window, and a z value refers to a value of a corresponding pixel in the pro-processed image. In order to train the first lookup table 128, an omega shape example image is used as a positive set and the other images are used as a negative set.

If it is determined that the first feature deduced from the first feature deducing unit 125 is below a predetermined reference value, the omega field judging unit 129 according to the exemplary embodiment judges that the window area includes the omega field.

Figure 4:
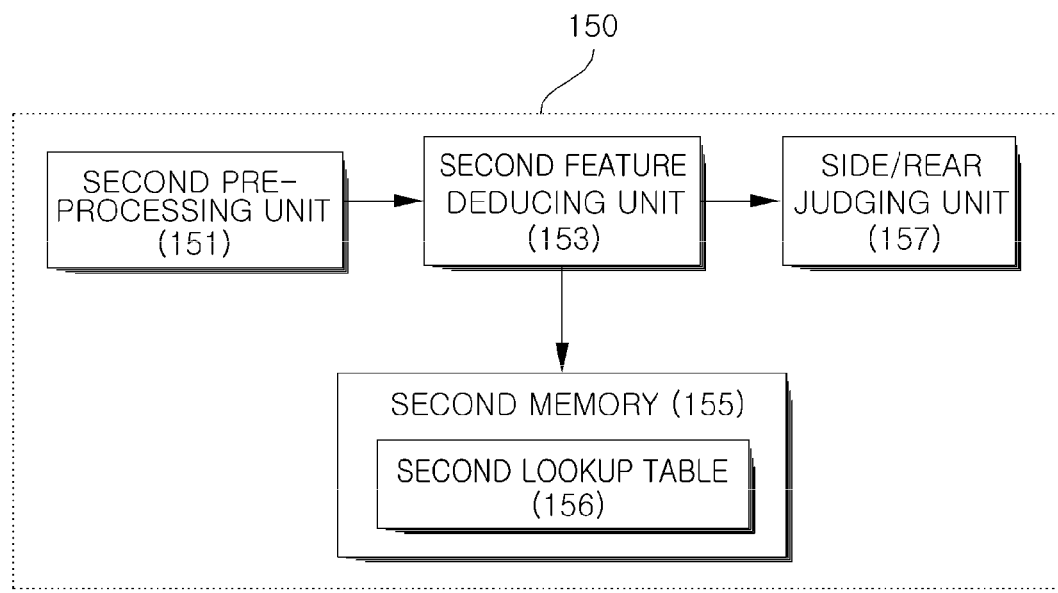
FIG. 4 is a block diagram illustrating a side/rear verifying unit according to an exemplary embodiment of the present invention.

FIG. 4 is a block diagram illustrating a side/rear verifying unit 150 according to an exemplary embodiment of the present invention.

The side/rear verifying unit 150 according to the exemplary embodiment includes a second pre-processing unit 151, a second feature deducing unit 153, a second memory 155, and a side/rear judging unit 157.

If the face detecting unit 140 fails to detect the human face from the upper body candidate area, the second pre-processing unit 151 according to the exemplary embodiment receives the upper body candidate area from the face detecting unit 140. The second pre-processing unit 151 performs an edge detecting process and an MCT process on the upper body candidate area as a pre-processing process.

The second feature deducing unit 153 according to the exemplary embodiment deduces a second feature for the pre-processed upper body candidate area using the second lookup table 156 stored in the second memory 155. In this case, the window area as shown in FIG. 3 may be preferably used.

The second memory 155 according to the exemplary embodiment stores the second lookup table 156. The second lookup table 156 is configured by a three-dimensional rectangular parallelepiped of f(x, y, z). An x value and a y value refer to a coordinate in the window area, and a z value refers to a value of a corresponding pixel in the pro-processed image. In order to train the second lookup table 156, a side/rear example image is used as a positive set and the other images are used as a negative set.

The second feature deducing unit 153 according to the exemplary embodiment deduces the second feature using plural f(x, y, z). Here, the f(x, y, z) refers to a weight on the corresponding coordinate.

If the second feature deduced by the second feature deducing unit 153 is below a reference value, the side/rear judging unit 157 according to the exemplary embodiment verifies/judges that a side/rear of a human exists in the corresponding image, that is, the upper body candidate area input from the second pre-processing unit 151.

Figure 5:
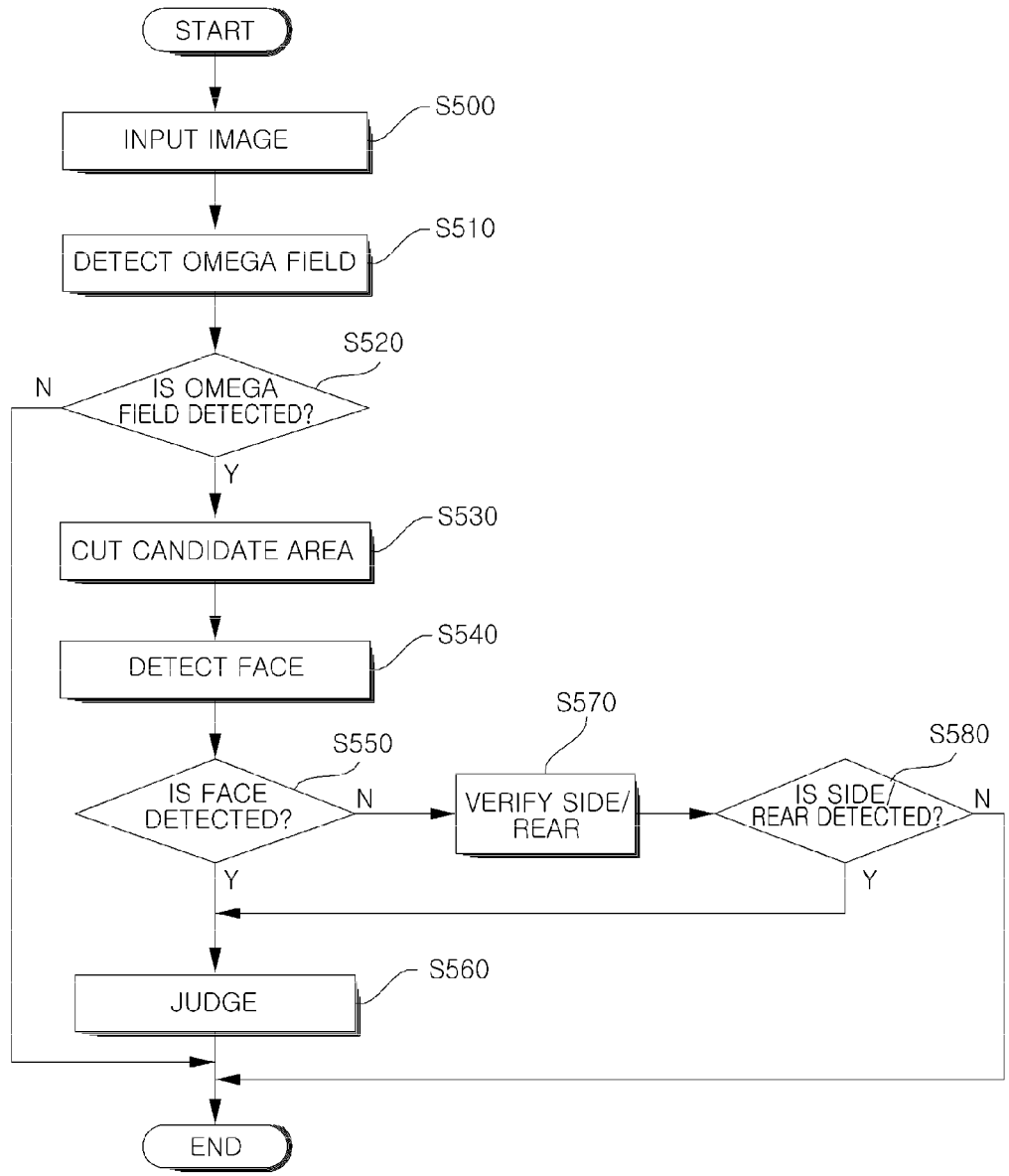
FIG. 5 is a flowchart illustrating an upper body detecting method according to an exemplary embodiment of the present invention.

FIG. 5 is a flowchart illustrating an upper body detecting method according to an exemplary embodiment of the present invention.

Hereinafter, the exemplary embodiment will be described with reference to FIGS. 1 to 5.

First, a target image is input to the image input unit 110 through a camera (S500).

The omega field detecting unit 120 detects the omega candidate area (S510). In this case, if the omega candidate area is not detected, it is determined that there is no human upper body in the object area (S520).

If the omega candidate area is detected, the upper body candidate area including the omega candidate area is cut by the candidate area cutting unit 130 (S530).

Then, the face detecting unit 140 detects the human face from the upper body candidate area (S540).

If the face is detected in step S540 (S550), the upper body judging unit 160 ultimately judges whether there is an upper body in the target image (S560).

However, if the face is not detected in step S540 (S550), the side/rear verifying unit 150 verifies whether there is a side or a rear of a human in the upper body candidate area (S570).

If it is verified that the side or the rear of a human exists in step S570 (S580), the upper body judging unit 160 ultimately judges whether there is an upper body in the target image (S560).

In contrast, if it is verified that the side or the rear of a human does not exist in step S570 (S580), it is determined that the human upper body does not exist in the target image and the upper body detecting process is completed.

Figure 6:
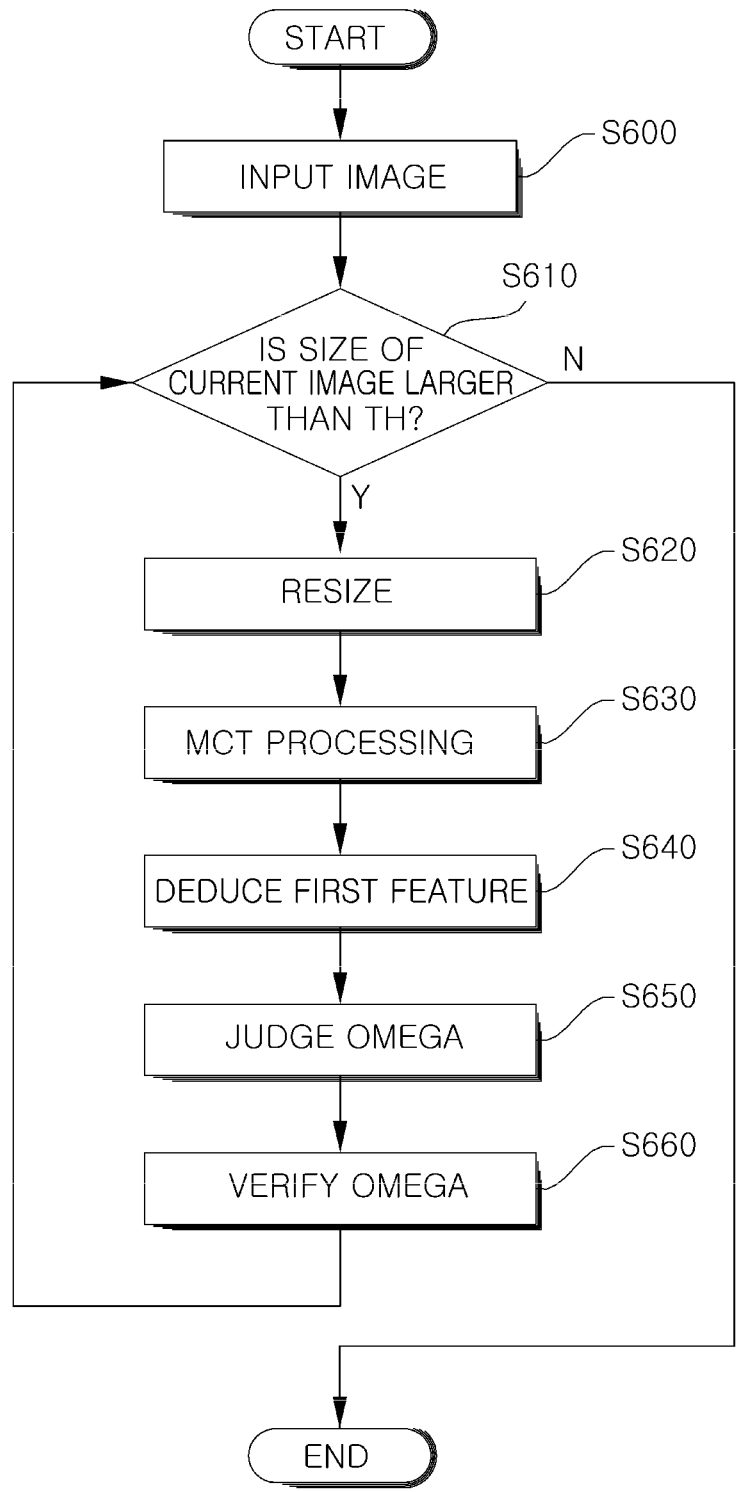
FIG. 6 is a flowchart illustrating an omega field detecting method according to an exemplary embodiment of the present invention.

FIG. 6 is a flowchart illustrating an omega field detecting method according to an exemplary embodiment of the present invention.

The exemplary embodiment will be described with reference to FIGS. 1 to 6.

First, a target image is input by the image input unit 110 (S600).

Then, the resizing unit 121 determines whether a width or a length of the target image is larger than a predetermined threshold TH (S610).

If the width or the length of the target image is larger than the predetermined threshold TH (S610), the resizing unit 121 performs a resizing process that reduces the size of the target image by a predetermined percentage (S620).

Then, the first pre-processing unit 123 performs a pre-processing process on the target image which is resized by the resizing unit 121 (S630).

Next, the first feature deducing unit 125 deduces a first feature from the pre-processed image (S640). In this case, the first lookup table is used.

On the basis of the first feature, it is judged whether the omega field is included in the target image according to the judgment of the omega field judging unit 129 (S650), and then the omega field is verified (S660).

However, in step S610, if the width or the length of the target image is not larger than the predetermined threshold (S610), the omega field detecting process is completed.

Figure 7:
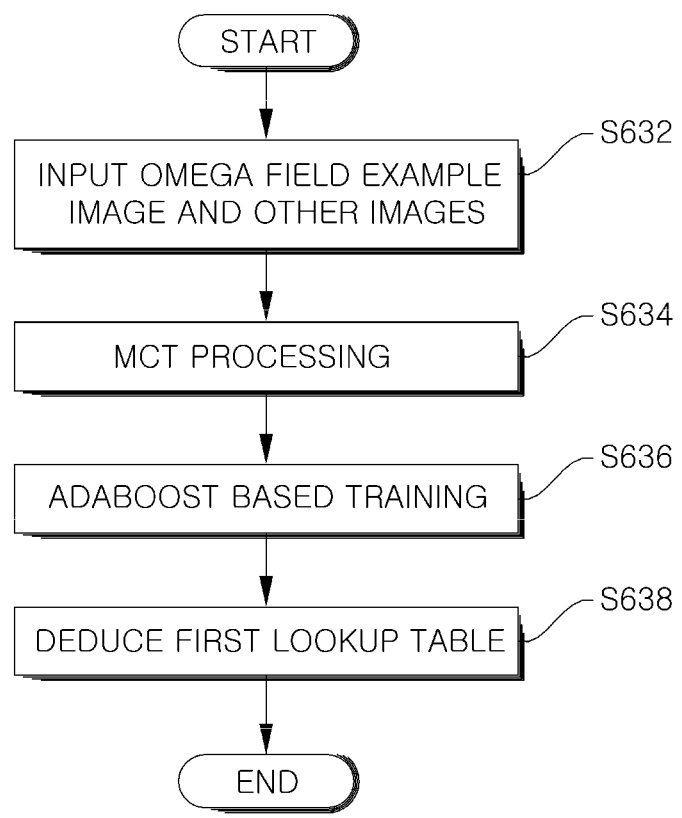
FIG. 7 is a flowchart illustrating a method of deducing a first lookup table used at the time of detecting an omega field according to an exemplary embodiment of the present invention.

FIG. 7 is a flowchart illustrating a method of deducing a first lookup table used at the time of detecting an omega field according to an exemplary embodiment of the present invention.

The exemplary embodiment will be described with reference to FIGS. 1 to 7.

First, the omega shape example image is input as the positive set, and the other images are input as the negative set (S632).

The pre-processing process is performed on the respective images (S634). In this case, the MCT process is preferably used as the pre-processing process.

Then, adaboost-based training is performed on the respective pre-processed images (S636).

The first lookup table is deduced based on the respective images trained based on the adaboost algorithm (S638).

As described above, the deduced first lookup table is used to detect the omega field.

Figure 8:
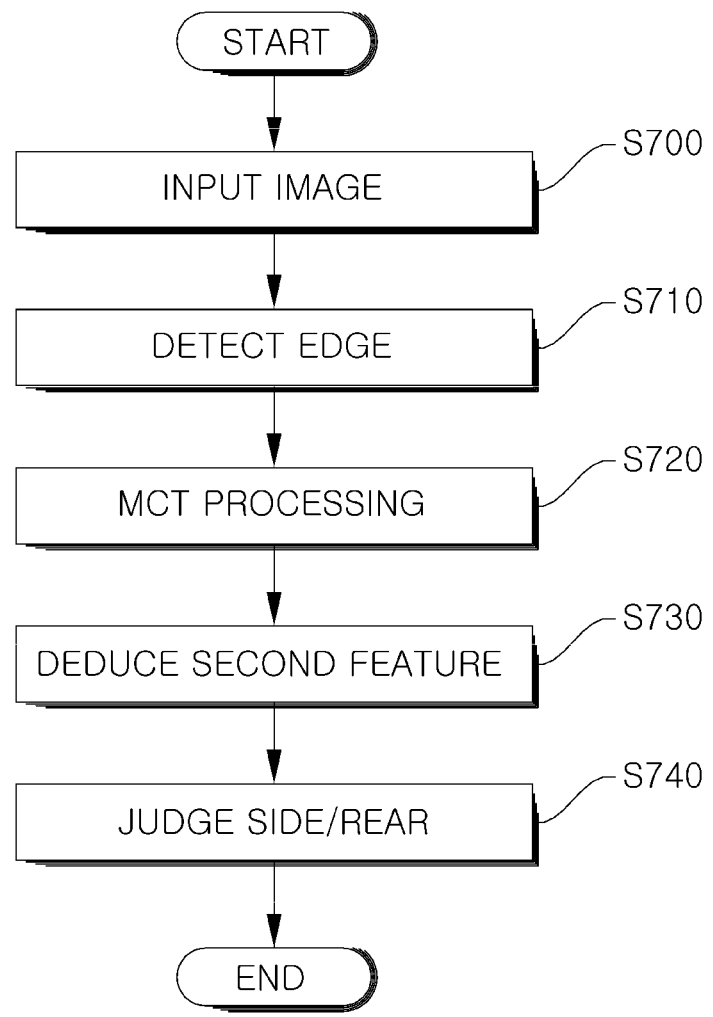
FIG. 8 is a flowchart illustrating a side/rear verification method according to an exemplary embodiment of the present invention.

FIG. 8 is a flowchart illustrating a side/rear verification method according to an exemplary embodiment of the present invention.

The exemplary embodiment will be described with reference to FIGS. 1 to 8.

If the human face is not detected from the upper body candidate area, the second pre-processing unit 151 receives the upper body candidate area from the face detecting unit 140 (S700).

Then, the second pre-processing unit 151 performs an edge detecting process and an MCT processing process (S710 and S720).

Then, the second feature deducing unit deduces a second feature from the upper body candidate area that is pre-processed by the second pre-processing unit 151 on the basis of the second lookup table 156 (S730).

The side/rear judging unit 157 judges whether the side or the rear of a human exists in the upper body candidate area by comparing the second feature with the predetermined reference value (S740).

Figure 9:
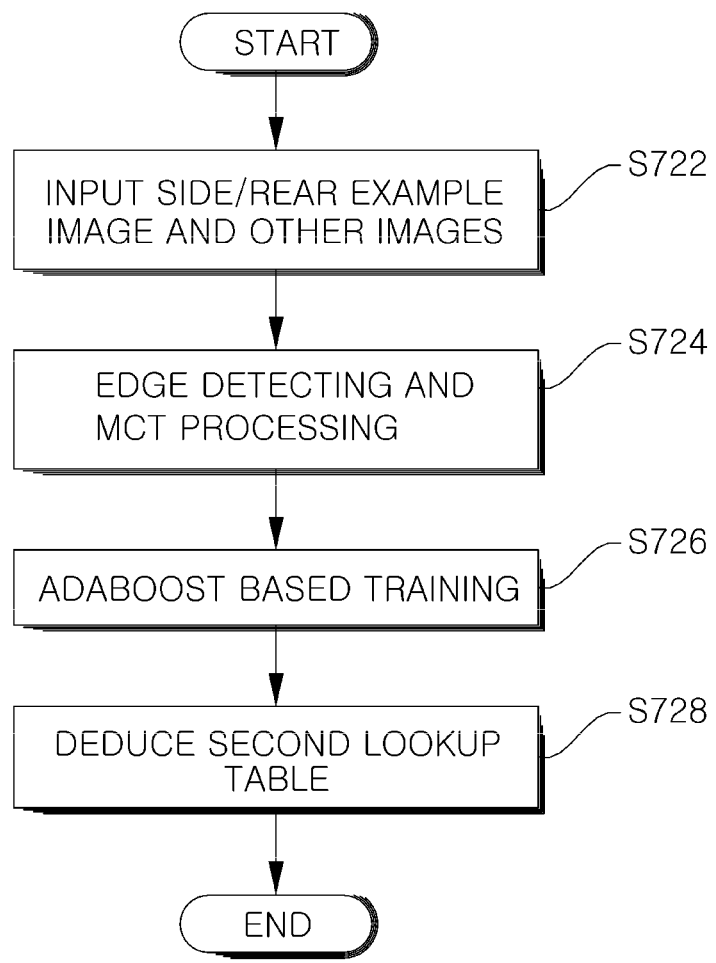
FIG. 9 is a flowchart illustrating a method of deducing a second lookup table used at the time of side/rear verification according to an exemplary embodiment of the present invention.

FIG. 9 is a flowchart illustrating a method of deducing a second lookup table used at the time of side/rear verification according to an exemplary embodiment of the present invention.

The exemplary embodiment will be described with reference to FIGS. 1 to 9.

First, the side/rear example image is input as the positive set and the other images are input as the negative set (S722).

Then, the pre-processing process is performed on the respective images (S724). In this case, the edge detecting process and the MCT process is preferably used as the pre-processing process.

Then, adaboost-based training is performed on the respective pre-processed images (S726).

The second lookup table is deduced based on the respective images trained based on the adaboost algorithm (S728).

As described above, the deduced second lookup table is used for the side/rear verification.

The upper body detecting apparatus and method according to the present invention may be applied to any field that requires a human detecting function such as an intelligent robot, security surveillance, a smart environment field, or a telematics area.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for detecting an upper body, comprising:
   an omega field detecting unit configured to detect an omega field including a shape formed of a face and a shoulder line of a human from a target image, the omega field detecting unit including:
   a resizing unit configured to reduce a width or a length of the target image by a predetermined percentage;

a first feature deducing unit configured to deduce a weight of coordinates of the reduced target image and deduce a first feature on the basis of the deduced weight; and an omega field judging unit configured to judge whether the omega field is included in the target image by comparing the first feature with a reference value;

a face detecting unit configured to detect whether the human face is included in the omega field;

a side/rear verifying unit configured to verify whether a side or a rear of a human exists in the omega field if the human face is not detected by the face detecting unit; and an upper body judging unit configured to judge whether the upper body of a human is included in the target image on the basis of a result of detecting the human face and configured to judge whether the upper body of a human is included in the target image on the basis of a result of verifying whether a side or a rear of a human exists in the omega field.

2. The apparatus of claim 1, wherein the omega field detecting unit further includes:

a first memory configured to store a three-dimensional first lookup table that is trained based.

3. The apparatus of claim 2, wherein the first lookup table is trained and deduced based on the adaboost algorithm using an omega shape example image as a positive set and the other images than the omega shape example image as a negative set.

4. The apparatus of claim 1, wherein the side/rear verifying unit includes:

a second memory configured to store a three-dimensional second lookup table trained based on the adaboost algorithm;

a second feature deducing unit configured to deduce a weight of coordinates of the omega field based on the second lookup table and deduce a second feature based on the deduced weight; and a side/rear judging unit configured to judge whether the side or the rear of a human is included in the omega field by comparing the second feature with a reference value.

5. The apparatus of claim 4, wherein the second lookup table is trained and deduced based on the adaboost algorithm using a human side/rear example image as a positive set and the other images than the human side/rear example image as a negative set.

6. A method for detecting an upper body, comprising:

detecting an omega candidate area including a shape formed of a face and a shoulder line of a human from a target image;

cutting the target image into the upper body candidate area including the omega candidate area;

detecting whether a human face appears in the upper body candidate area;

detecting whether a side or a rear of a human appears in the upper body candidate area if the human face is not detected in the upper body candidate area, and judging whether the upper body of the human is included in the target image according to a result of detecting the human face and according to a result of detecting wherein the omega candidate area is detected by:

reducing a width or a length of the target image by a predetermined percentage, deducing a weight of coordinates of the reduced target image and deducing a first feature on the basis of the deduced weight, and judging whether the omega field is included in the target image by comparing the first feature with a reference value.

7. The method of claim 6, wherein the judging includes:

if the human face is detected in the detecting of the human face, judging that the human upper body is included in the target image.

8. The method of claim 6, wherein the detecting includes:

determining whether a width or a length of the target image is larger than a predetermined threshold TH;

reducing the size of the target image by a predetermined percentage if the width or the length of the target image is larger than the predetermined threshold;

pre-processing the resized target image;

deducing a first feature from the pre-processed target image; and judging if the omega candidate area is included in the target image based on the deduced first feature.

9. The method of claim 6, wherein the detecting of the side or the rear of a human includes:

pre-processing the upper body candidate area, the pre-processing including any one of an edge detecting process and an MCT process;

deducing a second feature from the pre-processed upper body candidate area; and judging whether the side or the rear of a human exists in the upper body candidate area by comparing the second feature with a predetermined reference value.

* * * * *